(12) United States Patent  
Baker, Jr.

(10) Patent No.: US 7,805,849 B1
(45) Date of Patent: Oct. 5, 2010

(54) RETRACTABLE LINE LEVELER FOR MEDICAL EQUIPMENT

(76) Inventor: Charles E. Baker, Jr., 614 St. Marys Ave., Springfield, IL (US) 62702

( * ) Notice: Subject to any disclaimer, the term of this patent is extended or adjusted under 35 U.S.C. 154(b) by 108 days.

(21) Appl. No.: 12/316,704

(22) Filed: Dec. 15, 2008

Related U.S. Application Data

(60) Provisional application No. 61/007,611, filed on Dec. 14, 2007.

(51) Int. Cl.
*G01C 9/24* (2006.01)

(52) U.S. Cl. ............................. 33/369; 33/1 LE; 33/379

(58) Field of Classification Search ................. 33/1 LE, 33/347, 354, 369, 756
See application file for complete search history.

(56) References Cited

U.S. PATENT DOCUMENTS

| | | | | |
|---|---|---|---|---|
| 2,268,758 A | * | 1/1942 | Leroy | 33/1 LE |
| 2,680,302 A | * | 6/1954 | Standal | 33/369 |
| 3,996,927 A | | 12/1976 | Frank | |
| 4,228,588 A | * | 10/1980 | Horton, Jr. | 33/1 LE |
| 4,546,774 A | | 10/1985 | Haught | |
| 4,669,484 A | | 6/1987 | Masters | |
| 4,691,710 A | | 9/1987 | Dickens et al. | |
| 5,068,886 A | | 11/1991 | Lavia | |
| 5,168,633 A | | 12/1992 | Harrison et al. | |
| 5,280,789 A | | 1/1994 | Potts | |
| 5,492,322 A | * | 2/1996 | Smith | 33/379 |
| 5,758,657 A | | 6/1998 | MacEachern | |
| 6,071,243 A | | 6/2000 | MacEachern | |
| 6,094,833 A | * | 8/2000 | Medley, Jr. | 33/369 |
| 6,196,503 B1 | | 3/2001 | Cernosek et al. | |
| 6,499,225 B1 | * | 12/2002 | Steinich | 33/756 |
| 7,487,595 B2 | * | 2/2009 | Armstrong et al. | 33/1 LE |
| 7,624,508 B2 | * | 12/2009 | Beck | 33/1 LE |

* cited by examiner

*Primary Examiner*—G. Bradley Bennett
(74) *Attorney, Agent, or Firm*—Montgomery Patent and Design; Robert C. Montgomery; Joseph T. Yaksich

(57) ABSTRACT

A device and a method that aids in the leveling of intra-vascular catheters from the transducer to the patient for medical procedures takes the form of a small housing which encloses a strong resilient filament which is dispensed therefrom. A bubble level vial is fixedly mounted thereupon the housing. The device thereby provides a means to acquire the desired leveling pressure readings of the intra-vascular catheter with minimal amount of effort by attaching one (1) end of the filament there to the patient and the opposing end to the transducer. When finished, the filament is retracted and stored.

20 Claims, 8 Drawing Sheets

RETRACTABLE LINE LEVELER FOR MEDICAL EQUIPMENT

RELATED APPLICATIONS

The present invention was first described in and claims the benefit of U.S. Provisional Application No. 61/007,611 filed on Dec. 14, 2007, the entire disclosures of which are incorporated herein by reference.

FIELD OF THE INVENTION

The present invention relates generally to means for leveling and verifying a level for an intra-arterial catheter line used to monitor systemic blood pressure in patients, thereby improving patient care.

BACKGROUND OF THE INVENTION

Intra-arterial catheters or "art-lines" are used to continuously monitor systemic blood pressure in critically ill patients who may have an unstable cardiopulmonary status. This monitoring permits medical providers a means to better manage blood pressure through the titration of drugs to pressure or other methods, ultimately resulting in better care for patients. One (1) important aspect in using art-lines is that it is required that the line between the patient's heart and the transducer be completely level to obtain the most accurate reading. Medical personnel often resort to carpenter leveling devices to assist in this effort. Many may use small torpedo levels that are somewhat inaccurate when trying to level a much longer line. Others may use four-foot long levels that are unwieldy, take much room to store, and are terribly noisy if dropped. Accordingly, there is a need for a means by which intra-arterial catheters can be leveled without the disadvantages as listed above. The development of the invention described herein fulfills this need.

Due to the cumbersome nature of leveling intra-arterial lines, many medical personnel will attempt to forego use of a device and try to achieve the desired results simply by observing the location of the intra-arterial line and the transducer. By providing a convenient and easily deployable device for leveling these lines, medical personnel are more likely to utilize a leveling device and consequently provide improved patient care.

There have been attempts in the past to invent devices to aid in the leveling of medical equipment lines. U.S. Pat. No. 6,196,503 issued to Cernosek discloses a cable-tubing organizer system is provided for storing and organizing wire leads and tubing extending from monitoring equipment used in an operating room or other patient care environment. Unfortunately, this patent does not appear to disclose a retractable line leveling device for medical equipment.

U.S. Pat. Nos. 6,071,243 & 5,758,657 issued to MacEachern disclose pressure transducer positioning systems that appear to comprise optical systems for positioning a pressure transducer relative to a patient to accurately identify the elevation of the transducer relative to the specified location in order to provide an absolute measurement of fluid pressure. Unfortunately, these patents do not appear to disclose a retractable line leveling device that utilizes a line bubble level to determine the relationship between a patient's intra-arterial lines and a transducer.

U.S. Pat. No. 5,280,789 issued to Potts discloses an apparatus and method for measuring fluid pressure in a medical environment comprising a light source; a housing; at least one leveling tube comprising a closed transparent envelope containing a liquid and a bubble of gas, and lines formed on the envelope, and a locking system for selectively locking the housing means to prevent movement. Unfortunately, this patent does not appear to disclose a line leveling device that utilizes a bubble level nor does this patent appear to disclose a line leveling device that is retractable.

U.S. Pat. No. 5,168,633 issued to Harrison et al discloses a pressure transducer elevation gauge that comprises a pressure transducer elevation gauge positioned adjacent to a reclined patient and an indicator is vertically adjusted on an upright rod or stand to the precise level, or mid-axillary line of the patient's heart. Unfortunately, this patent does not appear to disclose a retractable line leveling device that utilizes a line bubble level to determine the relationship between a patient's intra-arterial lines and a transducer.

U.S. Pat. Nos. 5,068,886 & 4,691,710 issued to Lavia disclose a catheter positioning indicator for use with leveling devices adapted for use in hemodynamic monitoring. The indicator includes a radio transparent sheet material containing a plurality of spaced apart radio opaque material portions. Unfortunately, these patents do not appear to disclose a retractable line leveling device for medical equipment.

U.S. Pat. No. 4,669,484 issued to Masters discloses an automatic leveling device for monitoring hemodynamic pressure that operates to automatically maintain the pressure measuring device at the same level as the catheter implanted in the patient and includes a tube level with one (1) end being connected to the patient and at the same level as the catheter implanted in the patient and with the other end being connected to the vertically movable support for the pressure measuring device. Unfortunately, this patent does not appear to disclose a line leveling device for medical equipment that is retractable and portable.

U.S. Pat. No. 4,546,774 issued to Haught discloses a leveling device for hemodynamic monitoring transducer assembly that comprises an elongated flexible line that carries a small bubble level and has a loop at one (1) end for insertion on the transducer assembly and a spring clip on the opposite end for attachment to an adhesive patch on the side of the patient's chest at the level of the right atrium. Unfortunately, this patent does not appear to disclose a line leveling device that is retractable.

U.S. Pat. No. 3,996,927 issued to Frank discloses a blood pressure monitor leveling device that comprises an elevation and leveling adjustment arrangement for accurately locating pressure-to-current transducers, used in monitoring blood pressure during and post surgery, at an appropriate reference point relative to the patient. Unfortunately, this patent does not appear to disclose a line leveling device for medical equipment that is retractable and portable.

SUMMARY OF THE INVENTION

In light of the disadvantages, as previously discussed in the prior art, it is apparent that there is a need for a retractable line leveler for medical equipment which provides a means for accurately and quickly leveling of a standard intra-vascular catheter from a pressure transducer to a patient for medical procedures.

An object of the retractable line leveler for medical equipment provides a means to utilize between an insertion point of an intra-vascular catheter and a transducer.

Another object of the retractable line leveler for medical equipment provides a reliable means to acquire the necessary leveling pressure readings of an intra-vascular catheter with a minimal amount of effort.

A further object of the retractable line leveler for medical equipment provides accurate readings from catheters used to continuously monitor cardiovascular pressures in critically ill patients.

Still another object of the retractable line leveler for medical equipment offers a convenient advantage to obtaining pressure readings over conventional carpenter levels.

Still a further object of the retractable transducer for medical equipment provides a range of extension from six (6) inches to six (6) feet.

Yet another object of the retractable line leveler for medical equipment provides a compact and portable means for easily storage within a pocket, drawer, or other space limited location, where it can remain readily accessible.

Yet a further object of the retractable line leveler for medical equipment comprises a housing approximately two (2) inches square and approximately one-quarter (¼) inch thick.

Still another object of the retractable line leveler for medical equipment ensures better patient care by enhancing the efficacy of medical procedures.

An aspect of the retractable line leveler for medical equipment comprises a housing, a bubble level vial, a length of strong resilient filament and a pair of brackets. The housing is a small cuboidal-shape further comprising an exit aperture located on opposing sides of the housing to permit the passage of filament therethrough. Each housing aperture comprises a grommet. The housing further comprises a viewing window which provides visual access to a bubble vial level mounted upon the housing.

A further aspect of the retractable line leveler for medical equipment comprises a bubble vial level mounted inside the housing. The bubble vial level comprises level markings, a leveling bubble and a pair of tabs on either end that fit into mounting brackets located on the housing. The brackets provide a holding and securing means to the bubble level.

Still another aspect of the retractable line leveler comprises a plurality of mounting attachments that are attached to ends of the filament. The distal first end of the filament comprises the first attachment means. The first attachment means comprises a clip which provides a removably attaching means to a patient via an affixing means. The distal second end of the filament comprises the second attachment means. The second attachment means comprises a loop and fastening the same and securing via a crimped fastener. The third attachment means comprises substantially similar features as that of the first attachment means with a particular enhancement of a clip cover. The fourth attachment means comprises a snap fastener on the distal first end.

Still a further aspect of the line leveler for medical equipment comprises a circular casing comprising a casing aperture, a spool cylinder, a spring, a center restraint, a spool divider and a filament fastener. The filament is wound around a spool cylinder inside the circular casing. The spool cylinder rotates around a center restraint and a spring. The spring provides the tensile force which automatically retracts the filament when said filament is not being pulled or secured. The filament is connected to the spool cylinder via two (2) filament fasteners and said spool cylinder is divided by a spool divider which separates the opposing ends of said filament and prevents entanglement during deployment and retraction.

Yet another aspect of the retractable line leveler for medical equipment comprises a circular casing comprising two (2) opposing casing apertures through which the filament may exit said circular casing and provide a directing means to said filament to the exit apertures of the housing.

A method of utilizing the device may be achieved by performing the following steps: retrieving said device; extending the first end and the second end of the filament; attaching the first attachment means of said first end to the patient adjacent to the insertion point; attaching the second attachment means of said second end to the transducer; determining an initial degree of levelness; manipulating the height of said patient and/or the height of said transducer such that said heights of are into level alignment and until an acceptable degree of levelness is obtained; checking for any variations in the levelness in a periodic repeating manner using said device as described above; detaching said first attachment means and said second attachment means; retracting said filament back into the housing; storing said device in a convenient location until needed again; and benefiting from the convenience and accuracy of the device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
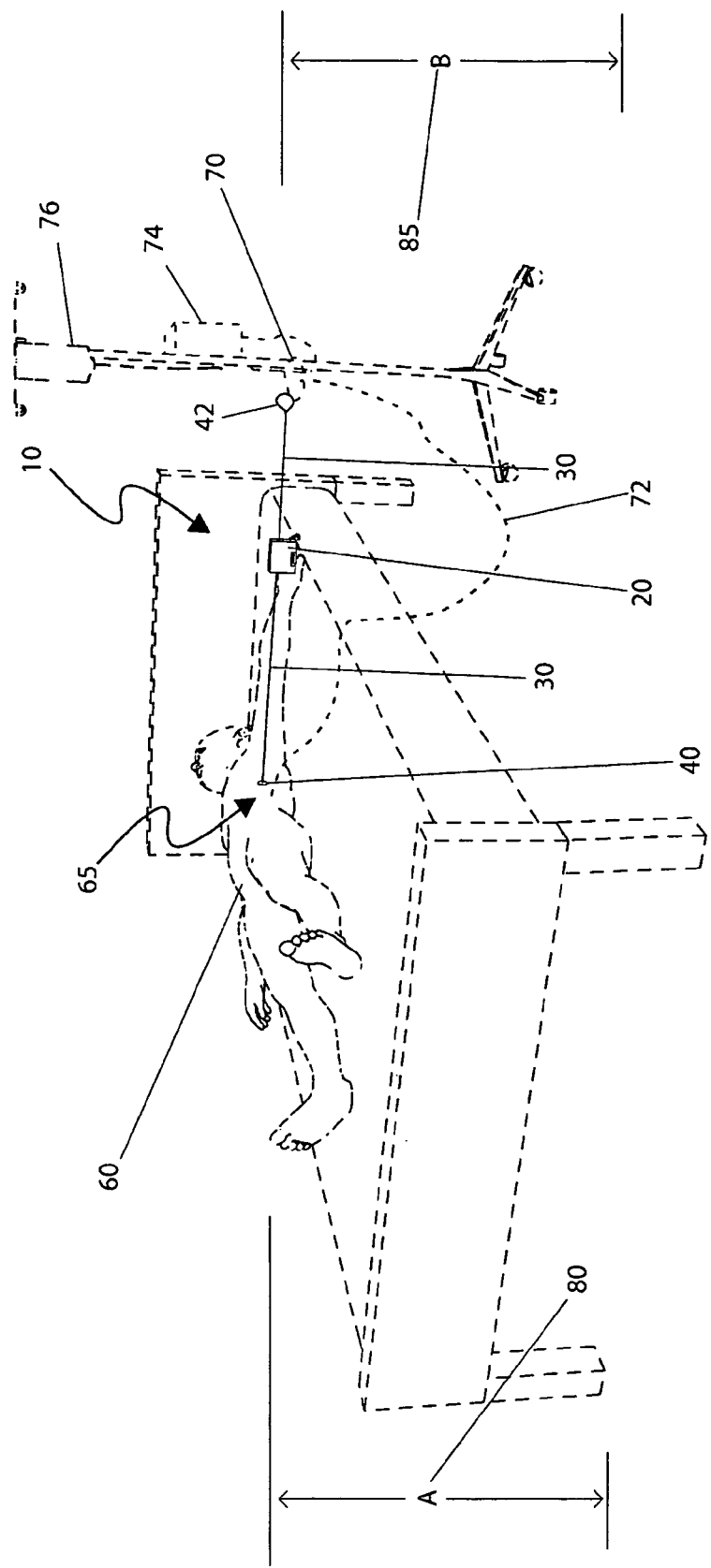
FIG. 1 is an environmental view of a retractable line leveler for medical equipment 10, shown in a utilized state, according to the preferred embodiment of the present invention.

DESCRIPTIVE KEY 10 retractable line leveler for medical equipment
20 housing
22 exit aperture
24 grommet
26 viewing window
28 bracket
30 filament
32 first end
34 second end
40 first attachment means
41 clip
42 second attachment means
43 loop
44 third attachment means 45 crimped fastener
46 fourth attachment means
47 clip cover
48 snap fastener
50 bubble vial level
52 level markings
54 leveling bubble
56 tab
60 patient
65 insertion point
70 transducer
72 intra-vascular catheter
74 monitor
76 mounting support
80 height "A"
85 height "B"
90 affixing means
91 patch
92 lead
100 circular casing
102 casing aperture
103 spool cylinder
104 spring
105 center restraint
106 spool divider
107 filament fastener

DETAILED DESCRIPTION OF THE PREFERRED EMBODIMENT

The best mode for carrying out the invention is presented in terms of its preferred embodiment, herein depicted within the FIGS. 1 through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a retractable line leveler for medical equipment (herein described as the "device") 10, which provides a means for accurately and quickly leveling of a standard intra-vascular catheter 72 from a pressure transducer 70 thereto a patient 60 for medical procedures. Intra-vascular catheters 72 are used in the medical field to continuously monitor cardiovascular pressures. They provide doctors and other medical personnel a low risk and reliable method to obtain such readings. Critically ill patients 60, with unstable cardiopulmonary status, often benefit from such continuous monitoring. Such status allows personnel to better manage blood pressure through drugs or other methods, ultimately resulting in better care for patients. It is required that the line between the patient's heart 65 and the transducer 70 be completely level to obtain the most accurate reading. Medical personnel often resort to carpenter levels to aid in this effort. Many may use small torpedo levels that are somewhat inaccurate when trying to level a much longer line. Others may use four-foot long levels that are unwieldy, take much room to store, and are terribly noisy if dropped. This noise is very startling to a patient who is already not in the best of health.

The device 10 generally comprises a small housing 20 and a length of strong resilient filament 30 which is dispensed therefrom. A bubble level vial 50 is fixedly mounted thereupon the housing 20. The device 10 thereby provides a means to acquire the necessary leveling pressure readings of the intra-vascular catheter 72 with minimal amount of effort by attaching a first end 32 of the filament 30 thereto the patient 60 and a second end 34 thereto the transducer 70.

Referring now to FIG. 1, an environmental view of the device 10, shown in a utilized state, according to the preferred embodiment of the present invention, is disclosed. The device 10 is utilized therebetween an insertion point 65 of the intra-vascular catheter 72, as provided thereon the patient 60, and the transducer 70. The catheter 72 is a small tube that is placed therein a vein or artery of the patient 60 by medical personnel during a medical procedure. The catheter 72 is typically required when continuous blood pressure measurement is necessary because of hemodynamic instability; for the safety of certain anesthetic techniques, such as deliberate hypotension, cardiopulmonary bypass, or major vascular surgery involving arterial clamping; for monitoring administration of vasoactive drugs; when frequent blood sampling is needed in patients without central venous access, and before certain types of surgery or as part of recovery monitoring in a medical situation. Accuracy of the catheter pressure readings is vital and is determined by the placement of the catheter 72 and the transducer 70 on a level horizontal plane. It is necessary that a height "A" 80 of the insertion point 65 of the catheter 72 and a height "B" 85 of the transducer 70 are equivalent and often requires periodic maintenance and checking. Ordinarily the transducer 70 and an associated monitor 74 are mounted to a mounting support 76 such as an intravenous (IV) stand or the like which is adjacent to the patient 60. The location of the insertion point 65 may vary depending upon the medical procedure being performed, the area which is being monitored, and the like.

The filament 30 is pulled out therefrom the housing 20 from the first end 32 and the second 34, as shown. The distal ends of the filament 30 are extended and held in place by the hands of a care provider such as a technician, nurse, doctor, or the like and then removably connected thereto the patient 60 and the transducer 70. The filament 30 is preferably made of a flexible linear element such as a monofilament plastic line, a plastic coated metal cable, or the like. Due to the flexible nature of the filament 30, the device 10 provides a straight linear connection therebetween the two distal ends 32, 34, no matter the length of the extension. The total range of extension as provided by the device 10 will range from six (6) inches to six (6) feet, although additional range is feasible for any leveling operation, and as such, should not be interpreted as a limiting factor of the present device 10. As the filament 30 is extended only during use, the overall size of the device 10 is governed by the size of the housing 20 during periods of non-use or storage. Thus, the device 10 may be comfortably stored in a pocket, drawer, or other space limited location, where it can remain readily accessible until needed.

Figure 2:
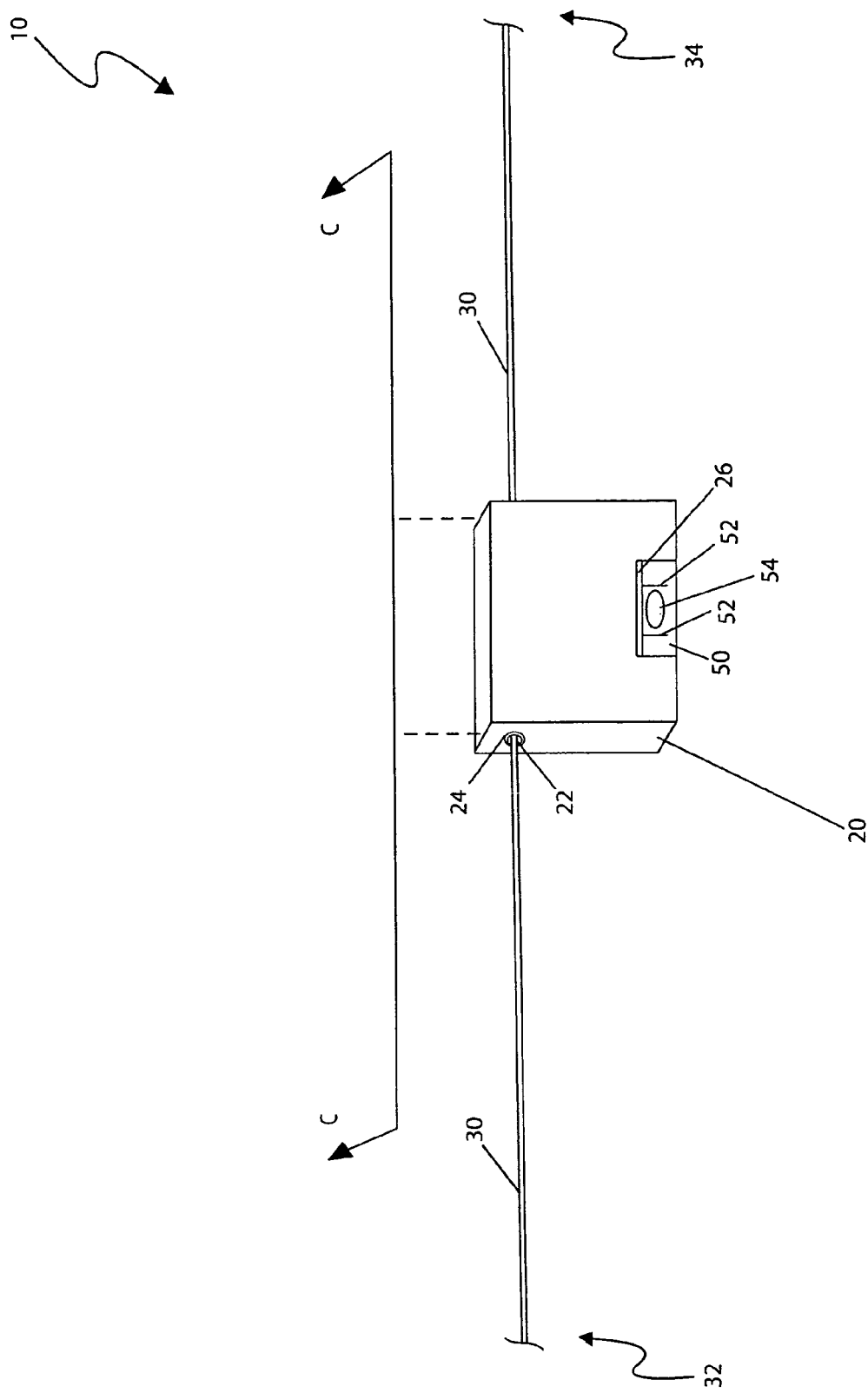
FIG. 2 is a front view of the retractable line leveler for medical equipment 10, according to the preferred embodiment of the present invention.

Referring next to FIG. 2, a front view of the device 10 according to the preferred embodiment of the present invention, is disclosed. The filament 30 is shown in a deployed state as extended from the first end 32 and the second end 34. The housing 20 comprises a generally small cuboidal shape further comprising an exit aperture 22 located thereon opposing sides of said housing 20. A grommet 24 preferably made of rubber, plastic, metal, or the like lines the exit aperture 22 and provides a means of reducing friction therebetween the exit aperture 22 and the filament 30 during extension and retraction of the same. The housing 20 further comprises a viewing window 26 which provides access and view to the bubble vial level 50. The bubble vial level 50 comprises expected features similar to other bubble levels, such as but not limited to; level markings 52, leveling bubble 54, and the like. The device 10 provides visual indicia of a level placement of the housing 20 and associated filament 30. The device can be positioned in a level nature in a manner similar to that of a line level, a carpenter level, or torpedo level as used in the construction industry. The overall size of the housing 20 is preferably approximately two (2) inches square and approximately one-quarter (¼) inch thick. The overall surface of the housing 20 is of a generally smooth and flat nature other than the exit apertures 22 and grommets 24 provided for the filament. A rear side of the housing 20 is a mirror image of the front side comprising the viewing window 26 and viewing access to the leveling bubble vial 50, thus enabling the device 10 to be used in a left-to-right and a right-to-left orientation.

Figure 3:
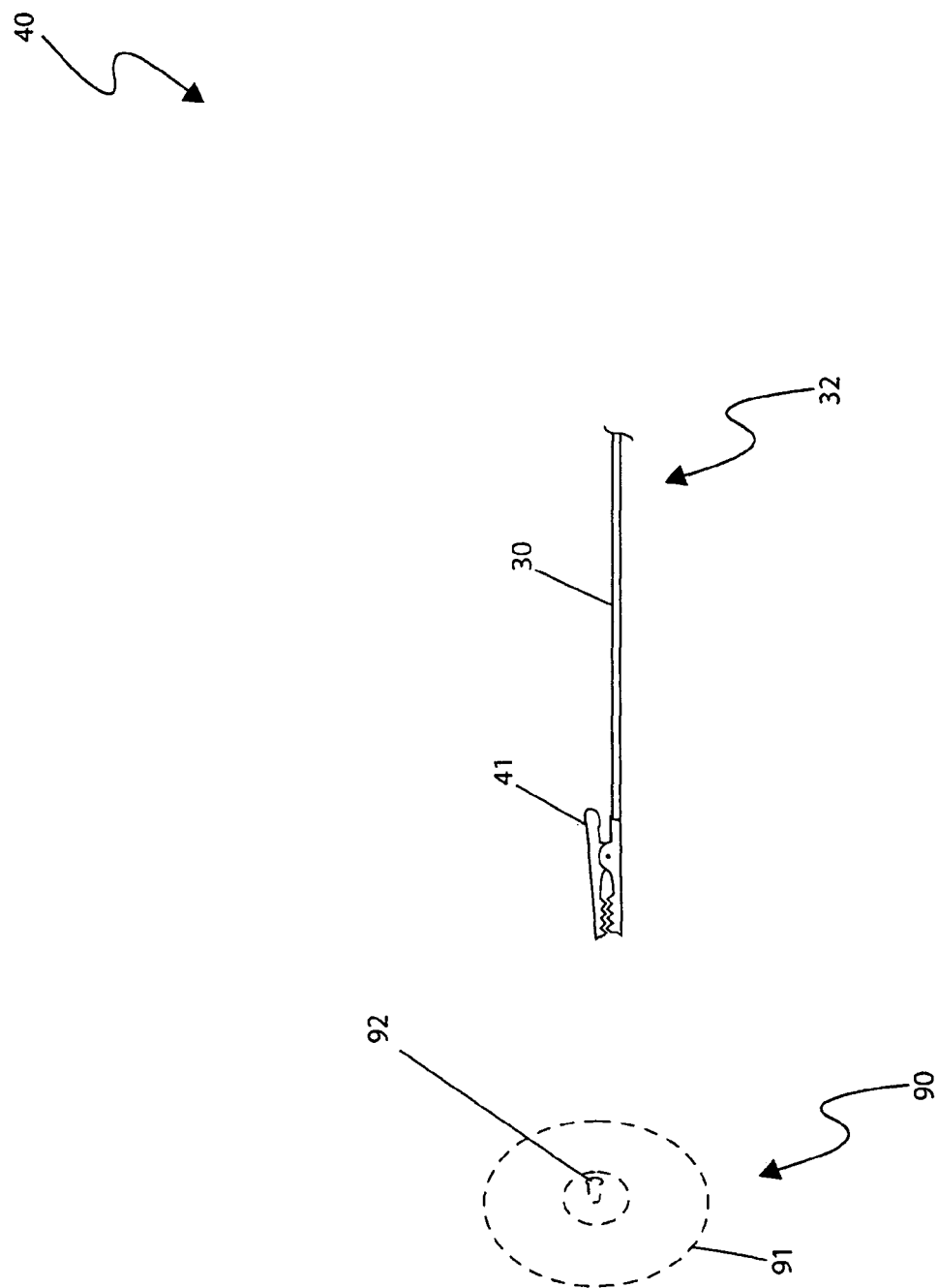
FIG. 3 is a close up view of a first attachment means 40 of the retractable line leveler for medical equipment 10, according to the preferred embodiment of the present invention.

Referring next to FIG. 3, a close up view of a first attachment means 40 of the device 10, according to the preferred embodiment of the present invention, is disclosed. The distal first end 32 of the filament 30 comprises the first attachment means 40 for the device 10. The first attachment means 40 comprises a clip 41, preferably an alligator clip or the like, which provides a removably attaching means thereto a patient 60 via an affixing means 90. The clip 41 is permanently attached thereto the end of the filament 30 in a typical material fastening technique. The affixing means 90 is depicted here comprising an electrocardiogram (ECG) patch 91 which is readily available in bulk in most medical environments. The patch 91 comprises an adhesive surface which can be affixed thereto the skin of the patient 60 adjacent thereto the insertion point 65 and further comprise a lead 92 to which the clip 41 can be removably attached. Although depicted utilizing available ECG patches 91 the device 10 may be introduced comprising a plurality of provided affixing means 90 similar to that of common ECG patches 91. The first attachment means 40 provides an easy means by which a user can handle and control the filament 30 as well as means to prevent said filament 30 from fully retracting within the housing 20.

Figure 4:
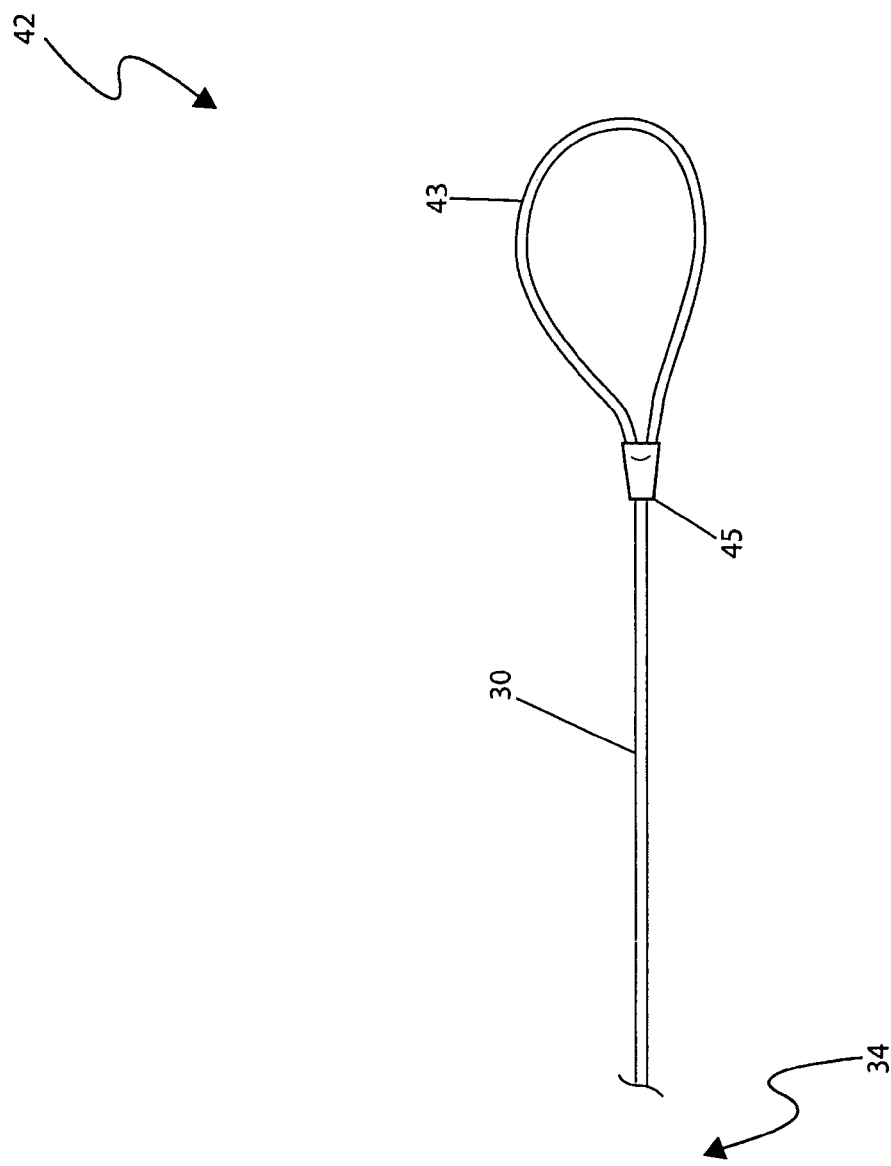
FIG. 4 is a close up view of a second attachment means 42 of the retractable line leveler for medical equipment 10, according to the preferred embodiment of the present invention.

Referring now to FIG. 4, a close up view of a second attachment means 42 of device 10, according to the preferred embodiment of the present invention, is disclosed. The distal second end 34 of the filament 30 comprises the second attachment means 42. The second attachment means 42 comprises a loop 43 which is preferably formed by wrapping the second end 34 of the filament 30 back on itself and fastening the same and securing via a crimped fastener 45. In such a manner the loop 43 and the crimped fastener 45 provides an easy means by which the user can handle and control the second end 34 of the filament 30 as well as a means to prevent the filament 30 from retracting totally within the housing 20.

Figure 5:
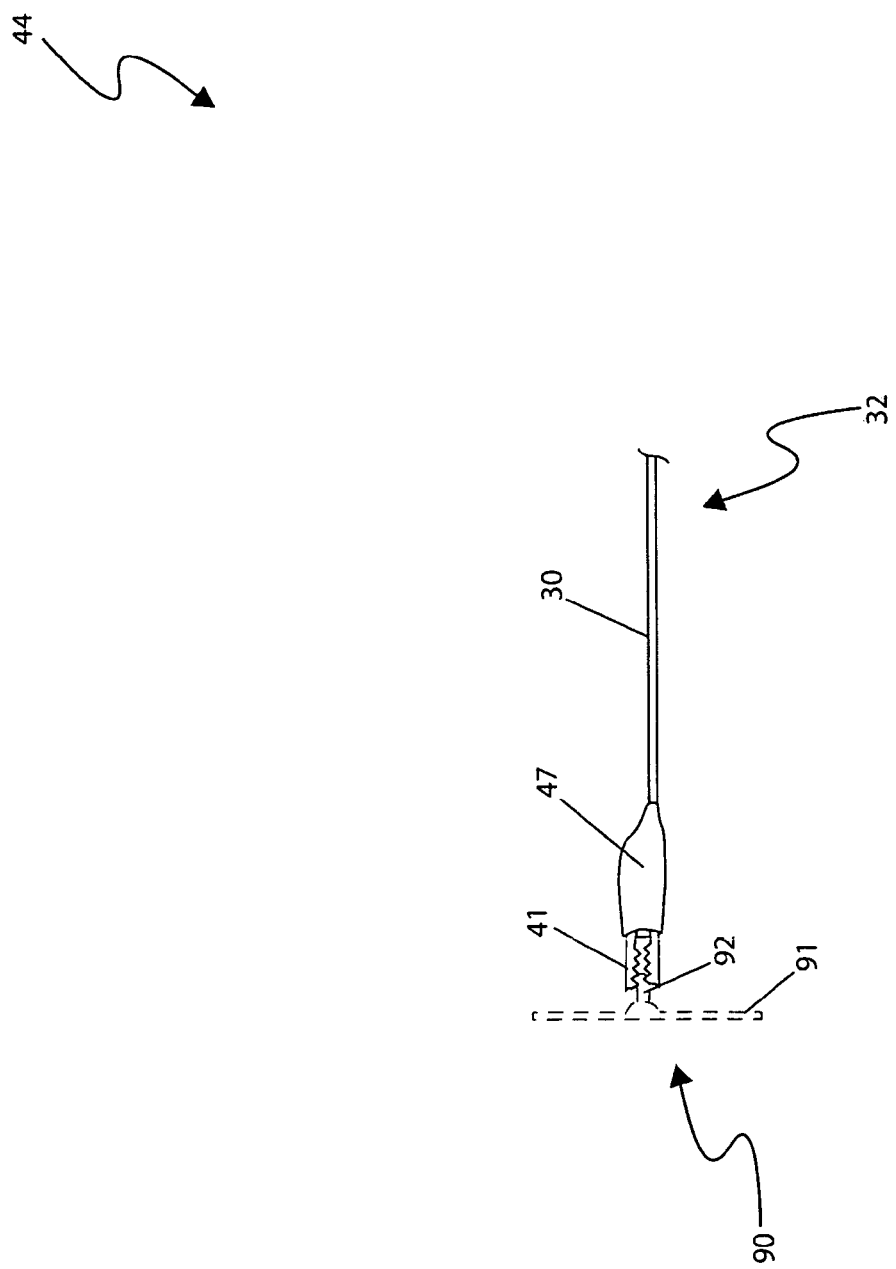
FIG. 5 is a close up view of a third attachment means 44 of the retractable line leveler for medical equipment 10, according to the preferred embodiment of the present invention.

Referring now to FIG. 5, a close up view of a third attachment means 44 of the device 10, according to the preferred embodiment of the present invention, is disclosed. The device 10 may be introduced comprising various other attachment means thereon the first end 32. The third attachment means 44 comprises substantially similar features and functions to that of the first attachment means 40 with a particular enhancement of a clip cover 47. The clip cover 47 comprises a plastic or rubber material which surrounds the clip 41 in a sleeve-like manner and provides a means of shielding the patent 60 and the user from the spring mechanism within said clip 41. The third attachment means 44 is depicted here in a removably connected state engaged therewith the lead 92 of the patch 91. The clip 41 is permanently attached thereto the end of the filament 30 in a typical material fastening technique. The third attachment means 44 provides an easy means by which a user can handle and control the filament 30 as well as means to prevent said filament 30 from retracting totally within the housing 20.

Figure 6:
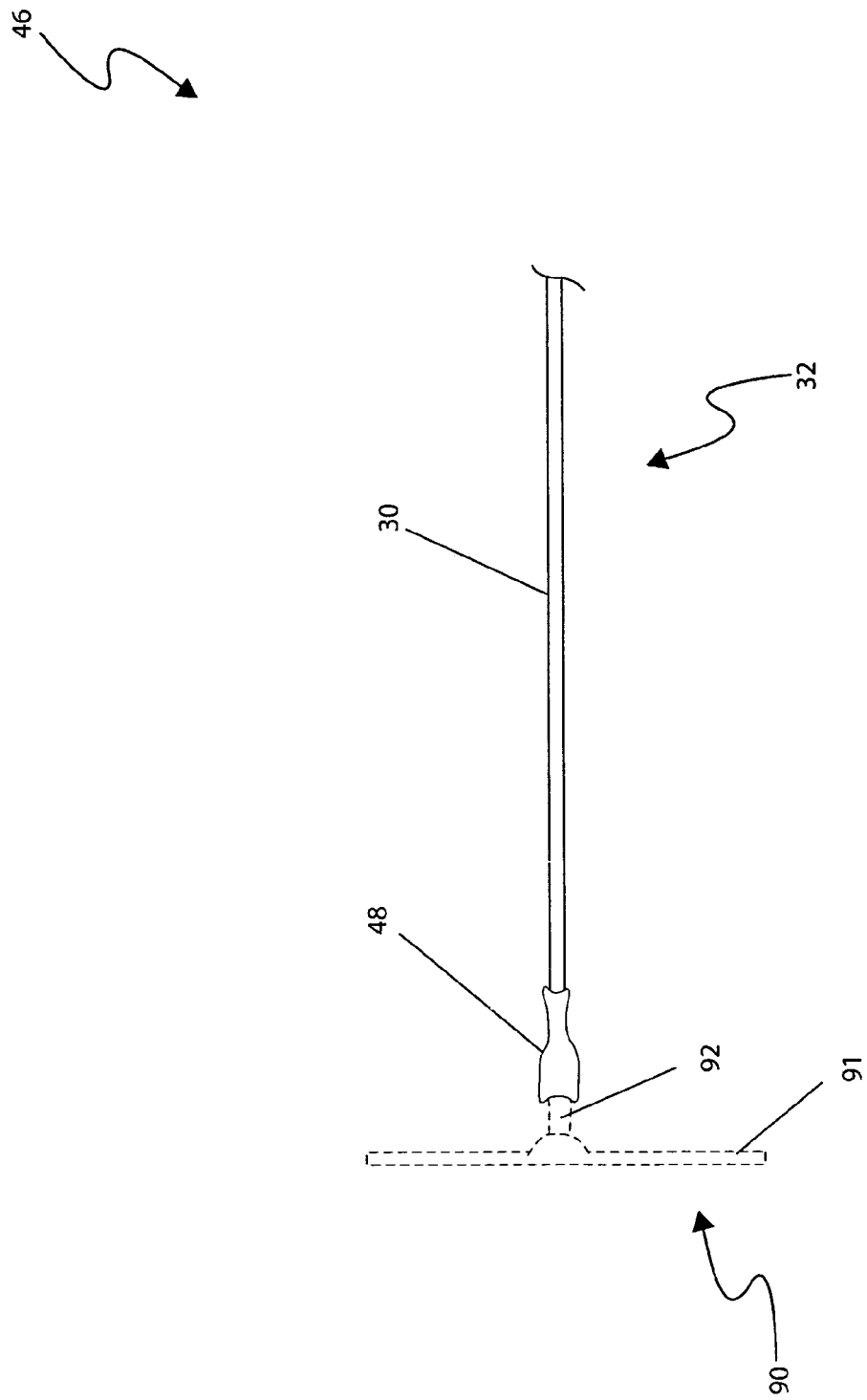
FIG. 6 is a close up view of a fourth attachment means 46 of the retractable line leveler for medical equipment 10, according to the preferred embodiment of the present invention.

Referring now to FIG. 6, a close up view of a fourth attachment means 46 of the device 10, according to the preferred embodiment of the present invention, is disclosed. The device 10 may be introduced comprising various other attachment means thereon the first end 32. The fourth attachment means 46 comprises a snap fastener 48 thereon the distal first end 32. The snap fastener 48 is preferably made of a plastic, a rubber-coated metal, or the like and is suitably sized to accommodate the insertion of the lead 92. The fourth attachment means 46 creates an interference fit therebetween the snap fastener 48 and the lead 92. The snap fastener 48 is permanently attached thereto the end of the filament 30 in a typical material fastening technique. The fourth attachment means 46 provides an easy means by which a user can handle and control the filament 30 as well as means to prevent said filament 30 from retracting totally within the housing 20.

Figure 7:
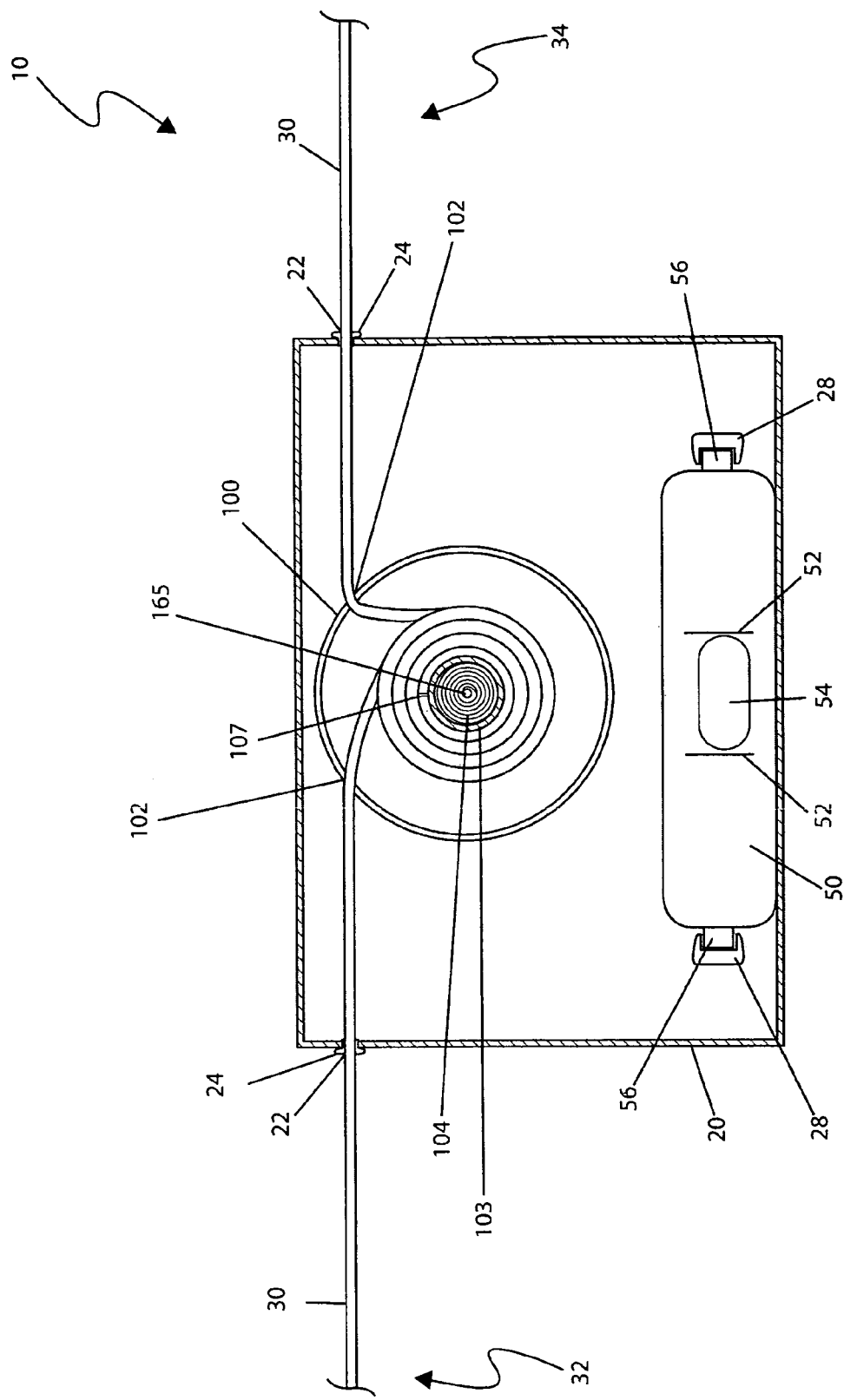
FIG. 7 is a sectional view taken along section line C-C of the retractable line leveler for medical equipment 10, according to the preferred embodiment of the present invention.

Referring now to FIG. 7, a sectional view taken along section line C-C of the device 10, according to the preferred embodiment of the present invention, is disclosed. This view depicts a central circular casing 100 which houses the length of wound filament 30. The filament 30 is wound therearound a spool cylinder 103 thereinside the circular casing 100. The spool cylinder 103 rotates therearound a center restraint 105 and a spring 104 connects therebetween. The center restraint 105 is preferably a rigid member such as a pin or the like and provides an axis of rotation for the spool cylinder 103. As the filament 30 is pulled therefrom the housing 20, the spool cylinder 103 rotates in a clockwise manner, thus winding the spring 104 which is connected to said spool cylinder 103 and the center restraint 105. The spring 104 provides the tensile force which automatically retracts the filament 30 when said filament 30 is not being pulled or secured when the device 10 is not in use. The circular casing 100 comprises two (2) opposing casing apertures 102 through which the filament 30 may exit said circular casing 100 and provide a directing means to said filament 30 to the exit apertures 22. The housing 20 further comprises two (2) brackets 28 which accept a tab 56 located thereon each end of the bubble level 50. The brackets 28 provide a holding and securing means thereto the bubble level 50. The various supports as required to maintain the spool cylinder 103, the circular spring 95, the center restraint 105, and the brackets 28 in place are provided as an integral part of the housing 20.

Figure 8:
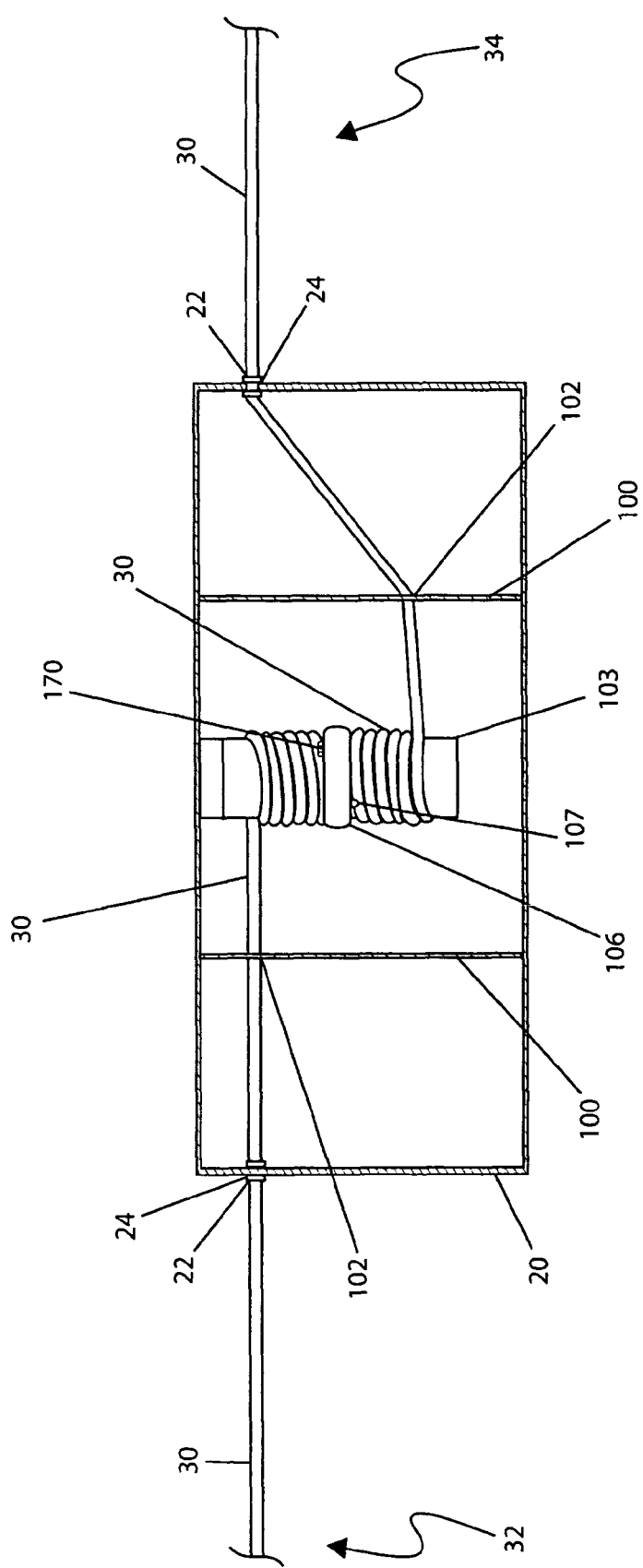
FIG. 8 is a top view of the retractable line leveler for medical equipment 10, according to the preferred embodiment of the present invention.

Referring now to FIG. 8, a top view of the device 10, according to the preferred embodiment of the present invention, is disclosed. This view depicts the top of the housing 20 removed and an upper portion of the circular casing 100 removed for clarity and illustrative purposes. A first portion of the filament 30 is wound on a rear portion of the spool cylinder 103 while a second portion of said filament 30 is wound on a forward portion of said spool cylinder 103. The filament 30 is connected to the spool cylinder 103 via two (2) filament fasteners 107 and said spool cylinder 103 is divided by a spool divider 107 which separates the opposing ends of said filament 30 and prevents the entanglement of the same during deployment and retraction. The first end 32 and the second end 34 of the filament 30 are deployed along opposing paths. The central spool cylinder 103 thus follows a generally clockwise rotation when the filament 30 is deployed and in a generally counter-clockwise rotation when the filament 30 is retracted. Such rotation is controlled by the spring 104 which compresses during deployment of the filament 30 and then unwinds during retraction to assist in said retraction. The spool cylinder 103 and the spring 104 are not provided with any locks or stops, and as such, will begin automatic retraction of the filament 30 as soon as outward pressure as provided by the user is released. The single directional nature of the spool cylinder 103 ensures that the housing 20 will remain midway between the distal ends 32, 34 of the filament 30 regardless of the degree of deployment. Such midpoint positioning ensures the optimum placement for levelness accuracy.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial setup of the intravascular catheter 70, the care provider would begin the leveling process using the device 10, as indicated in FIG. 1.

The method of utilizing the device 10 may be achieved by performing the following steps: retrieving said device 10; extending the first end 32 and the second end 34 of the filament 30; attaching the first attachment means 40 of said first end 32 thereto the patient 60 adjacent thereto the insertion point 65; attaching the second attachment means 42 of said second end 34 thereto the transducer 70; determining an initial degree of levelness; manipulating the height "A" 80 of said patient and/or the height "B" 85 of said transducer 70 such that said heights 80, 85 of are into level alignment and until an acceptable degree of levelness is obtained; checking for any variations in the levelness in a periodic repeating manner using said device 10 as described above; detaching said first attachment means 40 and said second attachment means 42; retracting said filament 30 back into the housing 20; storing said device 10 in a convenient location until needed again.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A retractable line leveler for medical equipment, comprising:
   a housing, comprising a reel;
   a length of resilient filament dispensed therefrom said reel therethrough said housing comprising a first distal end removably connected thereto a patient and a second distal end removably connected thereto said medical equipment; and,
   a level vial fixedly mounted thereupon said housing;
   wherein said line leveler provides a means for accurately and quickly leveling an intra-vascular catheter from said medical equipment thereto a patient.

2. The retractable line leveler of claim 1, wherein said housing further comprises a generally cuboidal shape further comprising:
   a pair of exit apertures located thereon opposing sides of said housing;
   a grommet lining an outer periphery thereof each of said pair of exit apertures, thereby providing a means of reducing friction thereof said exit aperture during extension and retraction of said filament;
   said level vial mounted therewithin said housing;
   a pair of viewing windows located on a front face and a rear face, thereby providing a viewing access thereto said level vial;
   wherein said housing device provides visual indication thereof a level placement of said housing and said filament.

3. The retractable line leveler of claim 2, wherein said level vial is a bubble vial level.

4. The retractable line leveler of claim 2, wherein said housing further comprises a size of approximately two (2) inches square and approximately one-quarter (¼) inch thick.

5. The retractable line leveler of claim 2, wherein said reel further comprises:
   a central circular casing which houses said filament comprising a pair of opposing casing apertures;
   a spool cylinder thereinside said circular casing wherein said filament is affixed thereto in a wound configuration mounted thereto an interior thereof said housing;
   a center restraint providing an axis of rotation thereto said spool cylinder mounted thereto an interior thereof said housing; and,
   a spring interconnecting said center restraint and said spool cylinder therebetween;
   wherein said pair of opposing casing apertures provide an exiting means therefor said filament during extension or retraction thereof;
   wherein said pair of opposing casing apertures provide a directing means therefor said filament thereto said pair of exit apertures;
   wherein said spool cylinder rotates in a clockwise manner when said filament is pulled in an outward direction, thus winding said spring;
   wherein said housing remains midway between said first distal end and said second distal end thereof said filament regardless of a degree of deployment, thereby providing an optimum placement for levelness accuracy; and,
   wherein said spring provides a tensile force which automatically retracts said filament when said filament is not being pulled or secured when said retractable line leveler is not in use.

6. The retractable line leveler of claim 5, further comprising a pair of brackets each of which accept a tab located thereon opposing ends thereof said level vial mounted thereto an interior thereof said housing;
   wherein said pair of brackets provide a holding and securing means thereto said level vial.

7. The retractable line leveler of claim 6, wherein said spool cylinder further comprises:
   a first filament fastener affixing a first portion of said filament on a rear portion of said spool cylinder, wherein said first portion is an intermediary location thereof said filament;
   a second filament fastener affixing a second portion of said filament on a forward portion of said spool cylinder, wherein said first portion is an intermediary location thereof said filament; and, a spool divider which separates and prevents an entanglement thereof said first portion and second portion thereof said filament of the same during extension and retraction.

8. The retractable line leveler of claim 1, wherein said filament further comprises a flexible linear element.

9. The retractable line leveler of claim 8, wherein said first distal end comprises an attached alligator clip for removably attaching said filament thereto a lead thereon said patient.

10. The retractable line leveler of claim 9, further comprising a clip cover for protecting said patient therefrom said alligator clip.

11. The retractable line leveler of claim 8, wherein said first distal end comprises a snap fastener for removably attaching said filament thereto a lead thereon said patient.

12. The retractable line leveler of claim 8, wherein said second distal end comprises a loop secured therewith a crimped fastener for removably attaching said filament thereto said medical equipment.

13. The retractable line leveler of claim 8, wherein said filament comprises a length in the range of six (6) inches to six (6) feet.

14. The retractable line leveler of claim 8, wherein said filament comprises a monofilament plastic line.

15. The retractable line leveler of claim 8, wherein said filament comprises a plastic coated metal cable.

16. A method of leveling an verifying a level usage thereof an intra-arterial catheter therefrom medical equipment thereto a patient utilizing a retractable line leveler comprises the following steps:
   providing said retractable line leveler, further comprising:
      a housing, comprising:
         a central circular casing which houses a filament comprising a pair of opposing casing apertures;
         a spool cylinder thereinside said circular casing wherein said filament is affixed thereto in a wound configuration mounted thereto an interior thereof said housing, further comprising:
            a first filament fastener affixing a first portion of said filament on a rear portion of said spool cylinder, wherein said first portion is an intermediary location thereof said filament;
            a second filament fastener affixing a second portion of said filament on a forward portion of said spool cylinder, wherein said first portion is an intermediary location thereof said filament; and,
            a spool divider which separates and prevents an entanglement thereof said first portion and second portion thereof said filament of the same during extension and retraction;
         a center restraint providing an axis of rotation thereto said spool cylinder mounted thereto an interior thereof said housing;
         a spring interconnecting said center restraint and said spool cylinder therebetween;
         a pair of exit apertures located thereon opposing sides of said housing; and,
         a grommet lining an outer periphery thereof each of said pair of exit apertures, thereby providing a means of reducing friction thereof said exit aperture during extension and retraction of said filament;
      a level vial mounted therewithin said housing, further comprising:
         a pair of brackets each of which accept a tab located thereon opposing ends thereof said level vial mounted thereto an interior thereof said housing; and,
         a pair of viewing windows located on a front face and a rear face thereof said housing, thereby providing a viewing access thereto said level vial; and,
      said filament comprising a length of flexible resilient material dispensed therefrom said spool cylinder therethrough said housing comprising a first distal end removably connected thereto a patient therewith a first attachment means and a second distal end removably connected thereto said medical equipment therewith a second attachment means;
   extending said first distal end and said second distal end thereof said filament;
   attaching said first attachment means thereof said first distal end thereto said patient adjacent thereto an insertion point;
   attaching said second attachment means thereof said second distal end thereto said medical equipment;
   determining an initial degree of levelness;
   manipulating a first height of said patient and a second height of said medical equipment such that said first height and said second height are in alignment and until an acceptable degree of levelness is obtained, as observed thereby said level vial;
   checking for any variations in levelness in a periodic repeating manner;
   detaching said first attachment means therefrom said patient;
   detaching said second attachment means therefrom said medical equipment; and,
   retracting said filament back into the housing, activated thereby detaching said first attachment means and said second attachment means.

17. The method of claim 16, wherein said first attachment means comprises an attached alligator clip for removably attaching said filament thereto a lead thereon said patient.

18. The method of claim 17, further comprising a clip cover for protecting said patient therefrom said alligator clip.

19. The retractable line leveler of claim 16, wherein said first attachment means comprises a snap fastener for removably attaching said filament thereto a lead thereon said patient.

20. The retractable line leveler of claim 16, wherein said second attachment means comprises a loop secured therewith a crimped fastener for removably attaching said filament thereto said medical equipment.

\* \* \* \* \*